United States Patent
De Block (12)

(10) Patent No.: US 6,625,842 B1
(45) Date of Patent: Sep. 30, 2003

(54) WIPER DEVICE FOR MOTOR VEHICLE PANES

(75) Inventor: Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 87 days.

(21) Appl. No.: 09/869,500

(22) PCT Filed: Sep. 28, 2000

(86) PCT No.: PCT/DE00/03389

§ 371 (c)(1),
(2), (4) Date: Jun. 28, 2001

(87) PCT Pub. No.: WO01/30622

PCT Pub. Date: May 3, 2001

(30) Foreign Application Priority Data

Oct. 28, 1999 (DE) ..................... 299 18 961 U

(51) Int. Cl.[7] .................................. B60S 1/40
(52) U.S. Cl. .................. 15/250.32; 15/250.43
(58) Field of Search .................. 15/250.32, 250.31, 15/250.44, 250.43

(56) References Cited

U.S. PATENT DOCUMENTS

| | | | | |
|---|---|---|---|---|
| 2,432,693 A | * | 12/1947 | Anderson | 15/250.32 |
| 2,548,090 A | * | 4/1951 | Anderson | 15/250.32 |
| 2,616,112 A | * | 11/1952 | Smulski | 15/250.32 |
| 2,728,934 A | * | 1/1956 | Krohm | 15/250.32 |
| 3,147,507 A | * | 9/1964 | Glynn | 15/250.32 |
| 3,641,614 A | * | 2/1972 | Newsome | 15/250.32 |
| 4,195,382 A | | 4/1980 | Macoherson | |
| 5,611,103 A | * | 3/1997 | Lee | 15/250.32 |
| 5,632,059 A | * | 5/1997 | Lee | 15/250.32 |

FOREIGN PATENT DOCUMENTS

| | | | | |
|---|---|---|---|---|
| CA | 633369 | * | 12/1962 | 15/250.32 |
| DE | 2 313 689 | | 10/1974 | |
| FR | 1184887 | * | 2/1959 | 15/250.32 |
| FR | 2 738 201 A | | 3/1997 | |
| GB | 2 044 082 A | | 10/1980 | |

* cited by examiner

Primary Examiner—Gary K. Graham
(74) Attorney, Agent, or Firm—Michael J. Striker

(57) ABSTRACT

The invention relates to a wiper apparatus (10) for motor vehicle windows, having a driven wiper arm (12), guided on one end on the motor vehicle, to the free end of which arm an elongated wiper blade (14) that can be pressed with a wiper strip (18) against the window is separably connected via a connection device (16) which toward the arm has a pivot bolt (40), whose hinge axis extends substantially transversely to the longitudinal direction of the wiper blade (14) in the working direction (double-headed arrow 42) of the wiper apparatus (10) and which on the side toward the wiper blade, in a middle portion of the wiper blade (14) on its side remote from the window (20), has a coupling part (34) with a bearing recess (48) for the pivot bolt (40), which can be introduced into the recess (48) via a mounting channel (60) that opens the bearing recess toward the side remote from the window (20), wherein the wiper blade (14) is provided with securing means, which are movable between a mounting position and a locking position to open and close the mounting channel (50). Simple, unproblematic disconnection of the wiper blade from the wiper arm and connection of the wiper blade to the wiper arm are attached if as the securing means, a pivot lever (66) which is movable between the two operating positions is supported on the coupling part (34), which pivot lever, in its mounting position, uncovers the mounting channel (50) and in its locking position closes the mounting channel (50).

12 Claims, 3 Drawing Sheets

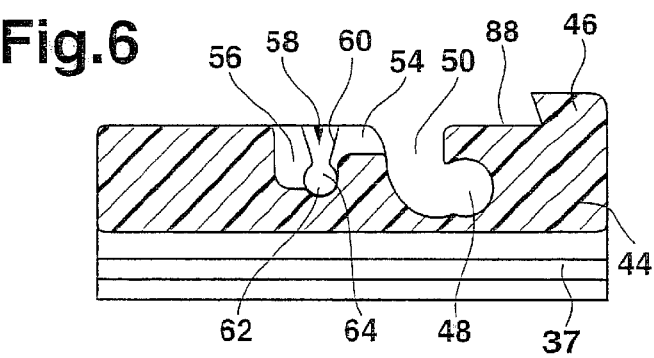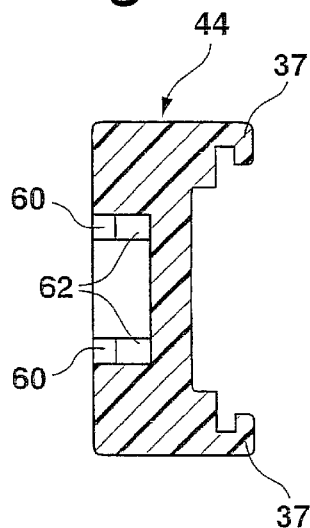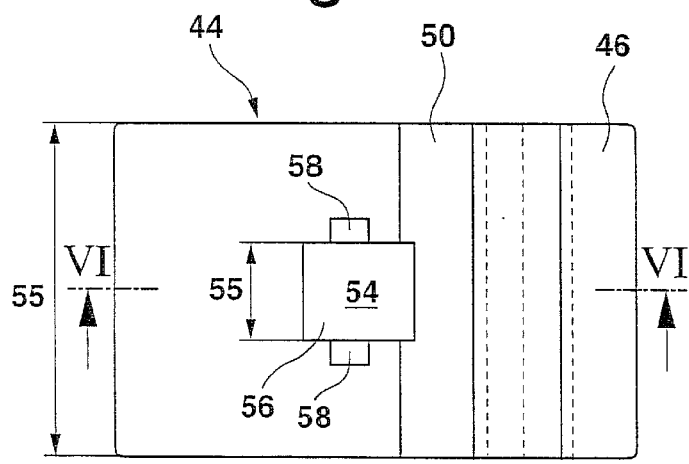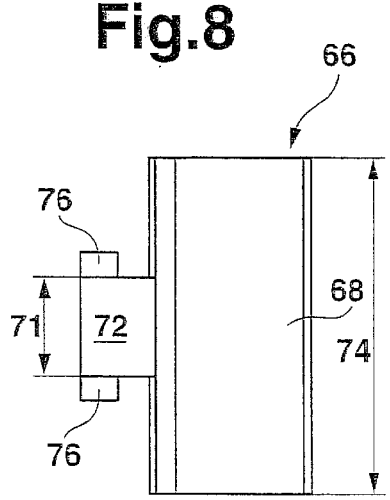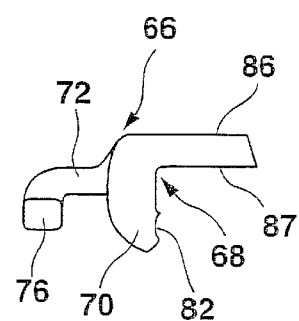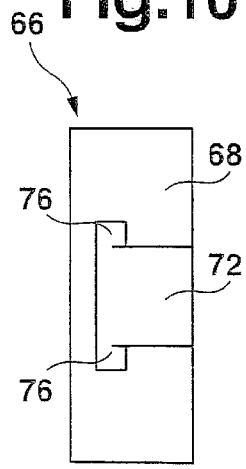

WIPER DEVICE FOR MOTOR VEHICLE PANES

BACKGROUND OF THE INVENTION

The invention is based on a wiper apparatus. In a known wiper apparatus of this type (German patent disclosure DE 23 13 689 A1), the wiper blade that belongs to the wiper apparatus has a guide channel that is open toward a base body of the wiper strip, and in this channel, a hairpin-shaped securing spring is displaceable between a mounting position and a locking position. This securing spring is provided, for opening and closing a recess which is disposed in a coupling part on the wiper blade and which represents the bearing recess for the wiper arm pivot bolt. The securing spring is prestressed toward the rubber guide channel, so that to displace the spring, the friction between the rubber and the spring has to be overcome. On the one hand, it should be easy for the user to slide the spring, for instance when changing wiper blades, but on the other, the spring must reliably close the bearing recess in the channel wall during wiping operation, so that the wiper blade cannot become disconnected from the wiper arm unintentionally. These two mutually contradictory demands cannot both be met equally well.

SUMMARY OF THE INVENTION

In the wiper apparatus of the present invention, the pivot lever is moved in a smooth bearing point between its two operating positions, so that the desired position can be reached reliably without expending force.

To avoid unintended opening of the channel, the connection device is provided with a barrier element for locking the pivot lever in its locking position.

If the wiper arm has a U-shaped cross section on its free end, and each of the two ends of the pivot bolt is retained on one of the two legs of the U, then the coupling part of the wiper blade after being mounted on the wiper arm can have the free end of the wiper arm fitted over it in such a way that the coupling part is located between the two legs of the U of the wiper arm. The result is an especially low-height construction for the wiper apparatus.

Visual checking of the bearing point or for proper support of the pivot bolt in its bearing recess is made possible if the base of the U joining the two legs of the U is located on the end of the legs of the U remote from the wiper blade and ends at a distance from the pivot bolt.

To keep the wiper arm as short as possible, the pivot lever bearing point on the coupling part is disposed toward the guided end of the wiper arm at a distance from the bearing recess for the pivot bolt, and the pivot axis of the pivot lever is oriented at least approximately parallel to the hinge axis.

In a feature of the invention, the base of the U of the free end of the wiper arm extends past the pivot lever bearing point and ends between this bearing point and the hinge axis of the bearing recess. As a result, the pivot lever is blocked in its closing position, when the wiper apparatus is in the operating position, or in other words when the wiper blade is pressed against the window to be wiped.

To optimize bearing the bolt in the coupling part, the pivot lever in its locking position protrudes with an extension into the mounting channel and in the region thereof continues the jacket face of the longitudinal recess.

So that the extension, or the bearing face embodied on it, will be properly fixed, the pivot lever is provided with a stop, which in the pivot lever operating position cooperates with a counterpart stop of the coupling part.

A further reduction in the structural height of the wiper apparatus is attained if the coupling part is located on the band face, remote from the window of a bandlike, elongated, spring-elastic support element, on whose band face toward the window the wiper strip is disposed. A low structural height of the wiper apparatus is important especially in view of the tendencies of the wiper blade to lift away from the window, a tendency that can occur at high travel speeds.

To achieve an advantageous fastening of the coupling part to the support element of the wiper blade, the coupling part at least in some portions engages the two longitudinal side edges of the support element in clawlike fashion.

Especially good wiper blade guidance with simultaneous relief of the joint between the wiper arm and wiper blade is obtained if, in a further feature of the invention, the width of the coupling part, measured transversely to the longitudinal direction of the wiper blade, is adapted to the spacing distance between the two legs of the U on the free end of the wiper arm.

Advantages in the manufacture of the wiper apparatus can be obtained if both the coupling part and the pivot lever are made from a plastic.

Further advantageous refinements and features of the invention are given in the ensuing description of an exemplary embodiment shown in the associated drawing.

BRIEF DESCRIPTION OF THE DRAWINGS

Shown in the drawing are:

FIG. 5, a plan view on a coupling part toward the wiper blade and belonging to the wiper apparatus;

FIG. 6, a section taken along the line VI—VI through the coupling part of FIG. 5;

FIG. 7, a section the line VI—VI through the coupling part of FIG. 5; FIG. 7, a section taken along the line VII—VII through the coupling part of FIG. 5;

FIG. 8, a plan view on a pivot lever belonging to the coupling part;

FIG. 9, a side view of the pivot lever of FIG. 8;

FIG. 10, another side view of the pivot lever of FIG. 8; and

DETAILED DESCRIPTION OF THE PREFERRED EMBODIMENT

Figure 1:
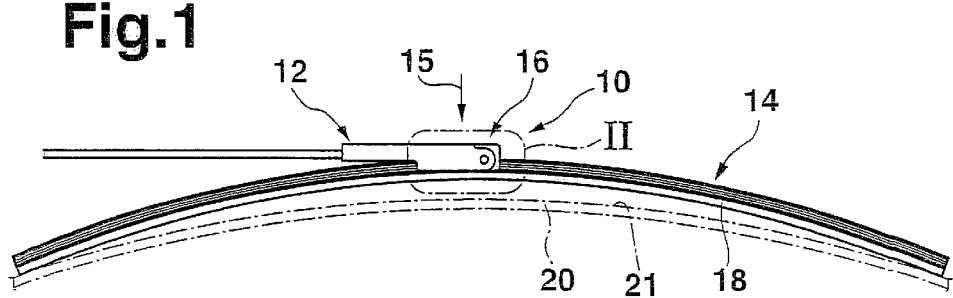
FIG. 1, a side view of the wiper apparatus of the invention.

A wiper apparatus 10 shown in FIG. 1 includes a driven wiper arm 12, guided at one end on the motor vehicle, of which FIG. 1 shows only its free end. The wiper apparatus 10 also includes an elongated wiper blade 14, which is pivotably and separably joined to the free end of the wiper arm 12 via a connection device 16.

The wiper arm 10 and thus also the wiper blade 14 are urged in the direction of an arrow 15 toward the window 20 to be wiped (FIG. 1), whose surface to be wiped is identified by reference numeral 21. Since the line 21 is meant to represent the most pronounced curvature of the window, it is quite clear that the curvature of the wiper blade, pressed against the window without loading only on its two ends, is greater than the maximum curvature of the window. Under the contact pressure (arrow 15), the wiper blade 14 presses with its wiper lip 26 over its entire length against the window surface 21. In a support element 32 for the wiper strip 26—which can comprise either multiple parts or be in one piece—a stress builds up which assures proper contact of the wiper strip 18 with its wiper lip 26 against the window. Since as a rule the spherically curved windows are not portions of spherical surfaces, the wiper blade 14 must be capable during its wiping motion of constantly adapting relative to the wiper arm 12 to the position at the time of the window surface. The connection device 16 is therefore embodied simultaneously as a hinge connection, whose hinge axis extends essentially in the wiping direction.

Figure 2:
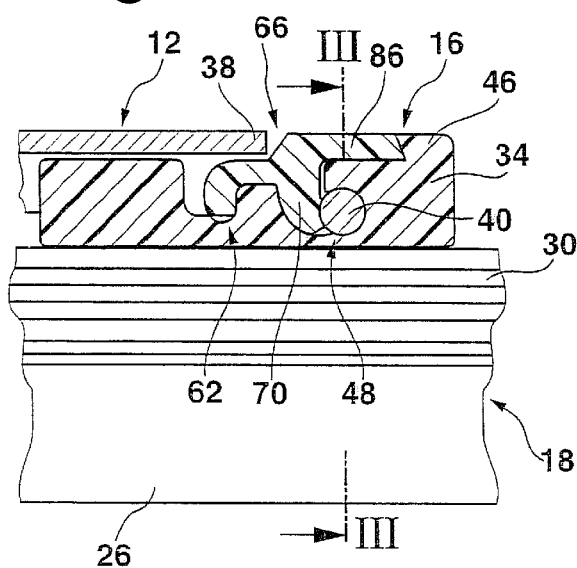
FIG. 2, a detailed marked II, shown enlarged and in section longitudinally of the wiper blade, with the wiper arm and the wiper blade in the operating position relative to one another.
Figure 3:
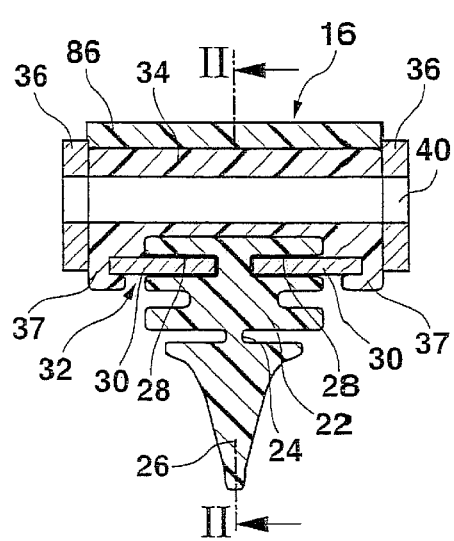
FIG. 3, a cross section through the arrangement of FIG. 2, in a section taken along the line III—III.

As FIGS. 2 and 3 in particular show, the wiper blade 14 has an elongated, rubber-elastic wiper strip 18, with which it can be pressed against the window 20 to be wiped, which is represented in FIG. 1 by dot-dashed lines. The wiper strip 18 has a top strip 22, to which a wiper lip 26 that takes on the actual wiping work is joined via a tilting rib 24. It can also be seen from FIG. 3 that in the top strip 22, opposite one another in terms of the plane of symmetry located perpendicular to the window 20, there are two longitudinal grooves 28, which each serve to receive one bandlike, elongated spring rail 30. The spring rails 30 together form a support element 32 for the wiper strip 18. The outer longitudinal edges, facing away from one another, of the securing rails 30 protrude out of their longitudinal grooves 28, at least in the middle portion of the wiper blade. FIGS. 1–3 also show that in the longitudinal middle portion of the wiper blade 14, on the upper band side of the support element 32 remote from the window, there is a coupling part 34 that belongs to the connection device 16. This substantially block-shaped coupling part 34 fits with clawlike extensions 36 around the two free, outer peripheral regions of the securing rails 30 and thus secures them in their longitudinal grooves 28. By suitable provisions, the coupling part 34 is joined solidly to the securing rails 30 or the support element 32 and is thus nondisplaceable longitudinally of the wiper blade. The special design of the coupling part 34 in its entirety is shown by the two drawings in FIGS. 2 and 3, of which FIG. 2 shows the coupling part in longitudinal section, while the wiper strip 18 disposed on the lower band side of the support element 32, toward the window 20, is shown together with its securing rails 30 in front elevation.

Figure 4:
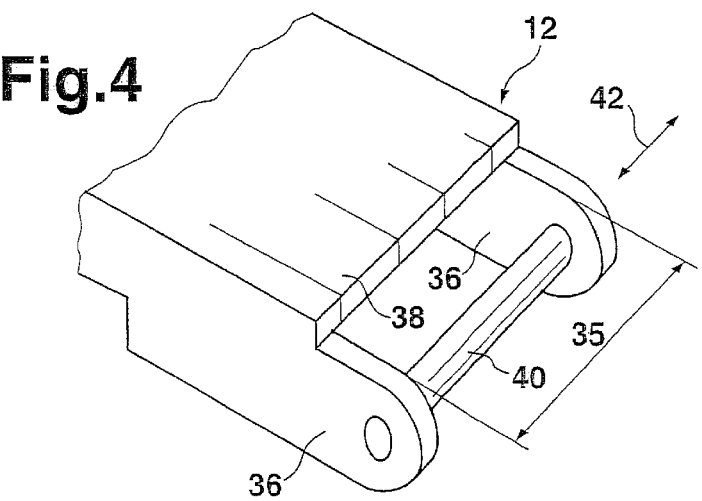
FIG. 4, the free end of the wiper arm that belongs to the wiper apparatus, show enlarged and in perspective.

On its free end, the wiper arm 12 has a U-shaped cross section (FIGS. 2–4), so that two legs 36 of the U facing one another at a distance and extending longitudinally of the wiper arm are the result; the legs of the U are joined together by the base of the U 38 on the top side of the wiper arm, facing away from the window. The two ends of a pivot bolt 40 are retained on the two legs 36 of the U, near the free end of the wiper arm 12. The pivot bolt 40 extends essentially in the direction of motion of the wiper arm, which is represented in FIG. 4 by a double-headed arrow 42.

The coupling part 34 will now be described in conjunction with FIGS. 6–10. It has a substantially block-shaped body 44 with the claws 37, which is solidly joined as already described to the support element 32 of the wiper blade 14. On one end, remote from the wiper arm 12, the body 44 has a protrusion 46 on its top side. The body 44 is also provided with a transverse bore 48, which is open toward the top side of the body 44 via a mounting channel 50. The mounting channel 50 extends in somewhat curved fashion and opens out laterally into the transverse bore 48. In the exemplary embodiment, the protrusion 46, transverse bore 48 and mounting channel 50 extend over the full width 52 of the body 44. On the other side of the transverse bore 48 with regard to the protrusion 46, the body 44 has a countersunk feature 54 originating at its top side and open toward the mounting channel 50 (FIG. 6). On its side remote from the mounting channel 50, the countersunk feature is provided with an indentation 56. Opening into this indentation 56 are two opposed hollowed features 58, whose contour is visible particularly in FIG. 6. The hollowed features 58 are open toward the top side of the body 44, via an insertion funnel 60. The insertion funnel 60 narrows into a bore-shaped chamber 62, so that a constriction 64 is created in the region where the insertion funnel 60 opens into the chamber 62. The two bore-like chambers 62 have a common bore axis, which is oriented at least approximately parallel to the axis of the transverse bore 48.

The coupling part 34 includes a pivot lever 66, whose design will be explained in conjunction with FIGS. 8–10. The pivot lever 66 has a base part 68 that is L-shaped in cross section, on one of the legs 70 of which L there is a hooklike extension 72. The length 74 of the base part 68 is approximately equal to the width 52 of the body 44. The length 71 of the extension 72 is adapted to the width 55 of the countersunk feature 54. On its two opposed sides, the extension 72 is provided with bearing journals 76, which have a non-round cross section (FIG. 9). The smaller diameter of the two bearing journals 76 is dimensioned such that these journals are capable of passing through the constriction 64 between the hollowed features 58 and the insertion funnels 60. The larger diameter of the bearing journals 76 is in harmony with the diameter of the bore-like chambers 62 and the body 44.

To complete the coupling part 34, the pivot lever 66 must be pivotably joined to the body 44. To that end, the bearing journals 76 are introduced into their chambers 62 via the insertion funnels 60, which is possible only whenever the pivot lever assumes approximately the position relative to the body 44 shown in FIG. 11; that is, only then can the bearing journals 76 of non-round cross section pass through the constrictions 64 and reach the bore-like chambers 62, which form bearing points for the pivot lever 66. Once the coupling part 34 has been completed, it is possible to connect the wiper blade 14 to the wiper arm 12.

Figure 11:
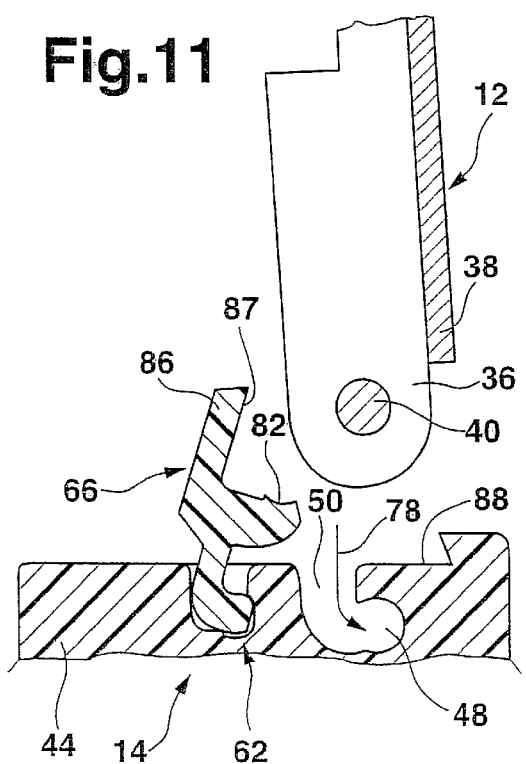
FIGS. 11–13, fragmentary sectional views of the coupling part of FIG. 2 with successive mounting steps between the wiper blade and the free end of the wiper arm, the free end being shown in longitudinal section.
Figure 12:
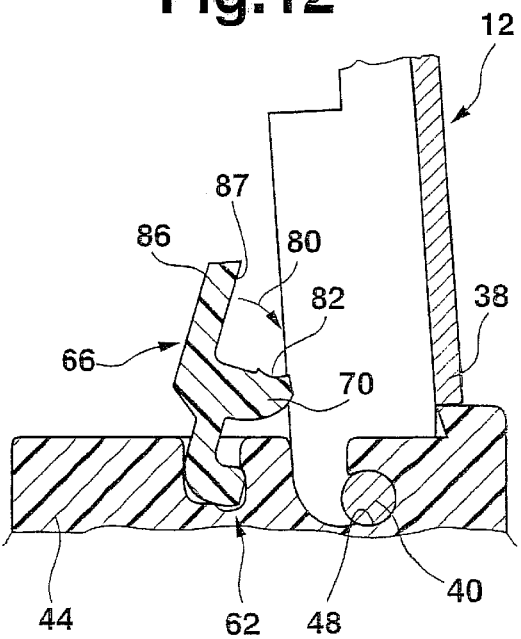
Figure 13:
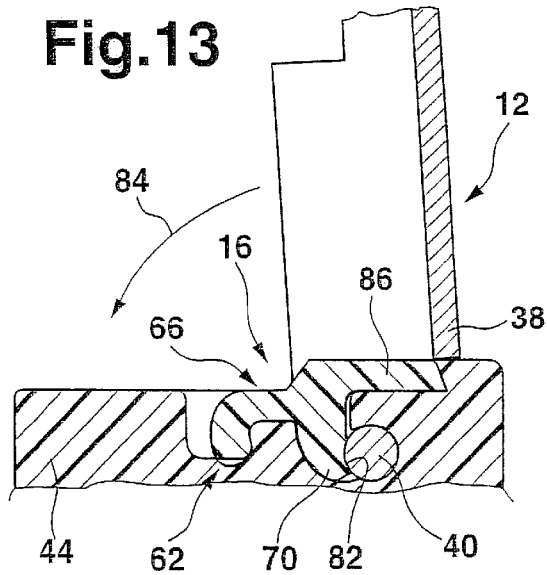

To that end, both the wiper arm 12 and the wiper blade 14 must be brought into a mounting position relative to one another that is shown in FIG. 11. By means of a relative motion between the wiper arm 12 and the wiper blade 14, represented in FIG. 11 by the arrow 78, the pivot bolt 40 can be introduced into the transverse bore 48 of the body 44, which thus forms a bearing recess for the pivot bolt 40, since the axis of the pivot bolt 40 and the axis of the transverse bore 48 now coincide (FIG. 12). To secure the pivot bolt 40 in its bearing recess 48, the pivot lever 66 is pivoted in the direction of the arrow 80 and FIG. 12, and one leg 70 of the L of the base part 68 of the pivot lever forms an extension that plunges into the mounting channel 50 (FIG. 13). This extension reaches as far as the pivot bolt 40 and is embodied such that in the region thereof, it represents a continuation of the jacket face of the bearing recess 48. On the leg 70 of the L of the base part 68, this region is identified by reference numeral 82. As a result of this design, the pivot bolt 40 is practically entirely surrounded in its prescribed operating position, so that longitudinal and torsional play in the pivot bolt bearing can be absorbed very well. After that, the wiper apparatus 10 can be put into its prescribed operating position shown in FIG. 1, in which a relative motion takes place between the wiper arm 12 and the wiper blade 14 about the hinge axis of the pivot bolt 40. This relative motion is represented in FIG. 13 by an arrow 84. In the operating position of the wiper apparatus 10 that it has now reached, the result is now the operating position of the connection device 16 as seen in FIG. 2. It is essential that in this position, the base of the U 38 of the wiper arm 12 extend past the pivot axis of the pivot lever 66 to the bearing recess 48 and the coupling part 34 and that it not end until a point between this bearing point 48 of the hinge axis and the pivot bolt 40. Thus the base of the U 38 forms a barrier element, which assures locking of the pivot lever 66 in this locking position. FIG. 2 also shows that the other leg 86 of the L of the base part 68 or of the pivot lever 66 forms a stop 87, which in the pivot lever operating position (FIG. 2) cooperates with a counterpart stop of the coupling part body 44. For the sake of greater clarity of illustration, this counterpart stop on the body 44, disposed on the other leg 86 of the L of the pivot lever 66, has been provided with reference numeral 88 in FIG. 6. For the sake of good guidance between the wiper arm and the wiper blade 14, the width 52 of the body 44, or coupling part 34, measured transversely to the longitudinal direction of the wiper blade, is adapted to the spacing distance 35 between the two legs 36 of the U on the free end of the wiper arm 12.

Rational production of both the body 44 and pivot lever 66 exists if these parts are made from a plastic. The body can be made from a somewhat yielding, elastic plastic, to make easy mounting of the wiper blade on the wiper arm possible when the pivot bolt 40 is introduced into its bearing recess 48.

As has been explained in detail, the wiper apparatus 10, as a securing means on the coupling part 34, has a movable pivot lever 66, which is movable between its two operating positions (the mounting position in FIG. 11 and the locking position in FIG. 13); in its mounting position, it uncovers the mounting channel 50, and in its locking position it closed the mounting channel.

What is claimed is:

1. A wiper apparatus (10) for a motor vehicle window, having a driven wiper arm (12), guided on a motor vehicle, wherein an elongated wiper blade (14) that can be pressed with a wiper strip (18) against the window is separably connected via a connection device to a free end of the arm, wherein the connection device has a pivot bolt (40) on the arm, wherein a hinge axis of said pivot bolt (40) extends substantially transversely to a longitudinal direction of the wiper blade (14) in a working direction of the wiper apparatus (10) and which on a side toward the wiper blade, in a middle portion of the wiper blade (14) on a side of the wiper blade (14) remote from the window (20), has a coupling part (34) with a bearing recess (48) for the pivot bolt (40), wherein said pivot bolt can be introduced into the recess (48) via a mounting channel (50) that opens the bearing recess toward the side remote from the window (20), wherein the wiper blade (14) is provided with securing means, wherein said securing means are movable between a mounting position and a locking position to open and close the mounting channel (50), characterized in that as the securing means, a pivot lever (66) which is movable between two operating positions is supported on the coupling part (34), wherein said pivot lever, in a mounting position, uncovers the mounting channel (50) and in a locking position closes the mounting channel (50), and wherein the connection device (16) for locking the pivot lever (66) in the locking position is provided with a barrier element (38), wherein said barrier element (38) is arranged on the wiper arm.

2. The wiper apparatus of claim 1, characterized in that the wiper arm (12) has a U-shaped cross section on its free end, and that each of two ends of the pivot bolt (40) is retained on one of two legs (36) of the U.

3. The wiper apparatus of claim 2, characterized in that a base of the U (38) joining the two legs (36) of the U is located on an end of the legs (36) of the U remote from the wiper blade (14) and ends at a distance from the pivot bolt (40).

4. The wiper apparatus of claim 2, characterized in that a width (52) of the coupling part (34), measured transversely to the longitudinal direction of the wiper blade (14), is adapted to a spacing distance (35) between the two legs (36) of the U on the free end of the wiper arm (12).

5. The wiper apparatus of claim 1, characterized in that a pivot lever bearing point (62) on the coupling part is disposed toward a guided end of the wiper arm (12) at a distance from the bearing recess (48) for the pivot bolt (40), and that the pivot axis of the pivot lever (66) is oriented at least approximately parallel to the hinge axis.

6. The wiper apparatus of claim 5, characterized in that a base of the U (38) of the free end of the wiper arm (12) extends past the pivot lever bearing point (62) and ends between said bearing point and a hinge axis of the bearing recess (48).

7. The wiper apparatus of claim 1, characterized in that the pivot lever (66) in its locking position protrudes with an extension (70) into the mounting channel (50) and in a region thereof continues a jacket face of the recess (48).

8. The wiper apparatus of claim 1, characterized in that the pivot lever (66) is provided with a stop (86, 87), wherein said stop in a pivot lever operating position cooperates with a counterpart stop (88) of the coupling part (34).

9. The wiper apparatus of claim 1, characterized in that the coupling part (34) is located on a band face, remote from the window (20) of an elongated, spring-elastic support element (32), wherein the wiper strip is disposed on the band face toward the window.

10. The wiper apparatus of claim 9, characterized in that the coupling part (34) at least in some portions engages two longitudinal side edges of the support element (32) in the manner of a claw.

11. The wiper apparatus of claim 1, characterized in that the coupling part (34) is made of a plastic.

12. The wiper apparatus of claim 1, characterized in that the pivot lever (66) is made of a plastic.

* * * * *